United States Patent [19]
Klamm

[11] 3,937,077
[45] Feb. 10, 1976

[54] TIRE PRESSURE INDICATORS AND METHODS OF MAKING AND USING THE SAME

[76] Inventor: Robert L. Klamm, 230 Spring Drive, St. Charles, Mo. 63301

[22] Filed: Nov. 12, 1973

[21] Appl. No.: 414,673

Related U.S. Application Data

[63] Continuation-in-part of Ser. No. 182,365, Sept. 21, 1971.

[52] U.S. Cl. ............................................. 73/146.8
[51] Int. Cl.² .......................................... B60C 23/04
[58] Field of Search............ 73/146.8, 146.3, 146.2, 73/146.4, 146; 137/227, 228; 116/70

[56] References Cited
UNITED STATES PATENTS

| | | |
|---|---|---|
| 2,190,530 | 2/1940 | Clarkson ............................ 73/146.8 |
| 3,230,968 | 1/1966 | Struby ................................ 73/146.8 |

Primary Examiner—Donald O. Woodiel

[57] ABSTRACT

The present invention relates to a tire pressure indicator device for measuring the interior pressure of automobile and truck tires and the like, comprising housing means provided with a chamber therein with an aneroid type air pressure measuring element and indicator mounted within said chamber and securing means operably mounted on said housing and adapted to secure the device to a conventional automobile or truck tire.

3 Claims, 2 Drawing Figures

TIRE PRESSURE INDICATORS AND METHODS OF MAKING AND USING THE SAME

BACKGROUND OF THE INVENTION

This application is a continuation in part of application Ser. No. 182,365, filed Sept. 21, 1971.

Conventional techniques and devices for air pressure indication have been generally complicated in construction and use and normally are constructed in such a fashion that they are not suitable for use in the ordinary tire environment. Further, a prime problem remains that these devices are not only unreliable in the normal environment but they also fail to give accurate indications.

SUMMARY OF THE INVENTION

It is therefore an object of the present invention to provide a tire pressure indicator device which has controllable means for accurately measuring and indicating the internal absolute air pressure within a conventional automobile or truck tire.

A further object of the present invention is to provide such a device which will perform such a function when installed on such a tire and is unaffected in operation by the weather or the tire environment.

A further object of the present invention is to provide such a device which is simply and economically manufactured and used.

These together with other objects and advantages which will become subsequently apparent, reside in the details and construction and operation as more fully hereinafter described and claimed, reference being had to the accompanying drawings forming a part hereof, wherein like numerals refer to like parts throughout, and in which;

DETAILED DESCRIPTION OF THE INVENTION

Figure 1:
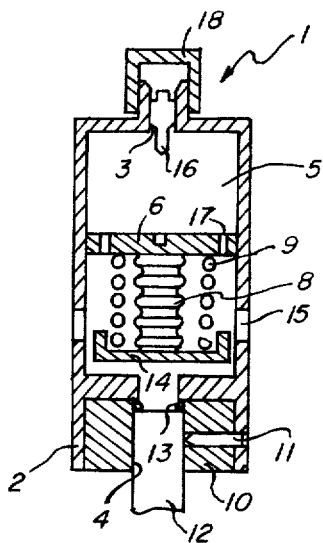
FIG. 1 is a sectional view of a tire pressure indicator device constructed in accordance with and embodying the present invention.

Referring now in more detail and by reference characters to the drawings which illustrate practical embodiments of the present invention, FIG. 1, is a sectional view of a tire pressure indicator device, 1, constructed in accordance with, used in and embodying the present invention.

As shown in FIG. 1, tire pressure indicator device, 1, comprises housing means, 2, provided with air inlet port, 3, and outlet port, 4. Also, provided within housing, 2, is chamber, 5.

Mounted within chamber, 5, is support member, 6. Attached to support member, 6, is aneroid, 8, which is biased to a particular position by calibration spring, 9. When used herein, aneroid contemplates a chamber which is evacuated and air sealed.

In operation, device, 1, is secured to the valve stem, 12, of a tire on a conventional automobile or truck by means of securing means, 10, operably mounted in air outlet port, 4. In the preferred embodiment of this invention, housing, 2, would be constructed of a plastic such as Lexan and securing means, 10, preferably made of metal is mounted in port, 4, and held secure in position by lock pin, 11, which also helps secure device, 1, to stem, 12. Seal, 13, is provided to minimize air leakage from the tire while device, 1, is installed.

Secured to the free end of aneroid, 8, is indicator ring, 14, which, in normal operation is visible through window, 15, provided in housing, 2. By appropriate color coding, or other types of coding, of indicator ring, 14, the position of which is an indication of tire pressure, an operator may readily determine whether, tire pressure is near normal, below normal or above normal.

Various "normal" tire pressures may be metered by device, 1, by simply changing calibration spring, 9.

Figure 2:
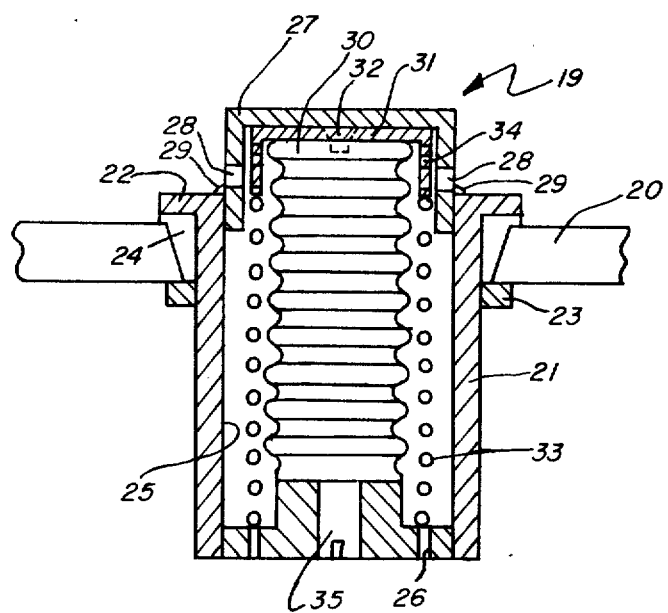
FIG. 2 is a sectional view of another tire pressure indicator device constructed in accordance with and embodying the present invention.

Schrader valve, 16, is provided in inlet port, 3, to allow filling of the tire through device, 1, while the device is installed on a tire stem, 12. Feed through passages, 17, are provided in fastener, 6, to allow air to pass through chamber, 5, and into stem, 12. Cap, 18, is a conventional automobile valve cap. Another embodiment of the present invention is shown in FIG. 2. The device, 19, shown in FIG. 2 is designed primarily for installation in the rim, 20, of a conventional motor vehicle wheel provided with tubeless tires. In FIG. 2, toward the bottom of the drawing is the air filled tire chamber, while to the top is the atmosphere.

As shown in FIG. 2, tire pressure indicator device, 19, includes housing means, 21, which is provided with flange, 22, which together with threaded member, 23, secures housing means, 21, to rim, 20. Seal, 24, may be provided to prevent air leakage from within the tire to the atmosphere. Housing means, 21, is provided with chamber, 25, and air inlet ports 26, which provide air passages from within the tire to chamber, 25. End cap, 27, is shown mounted to housing means, 21, such that the viewing window, 28, provided in end cap, 27, remains visible. Sealing means, 29, may be provided to present air leakage.

Mounted within chamber, 25, is conventional bellows, 30, which has indicator cap, 31, secured to one end thereof by fastener, 32. Spring, 33, is also provided within chamber, 25, to bias indicator cap, 31, and thereby bellows, 30, to a particular air pressure. Indicator cap is marked as indicated by bars, 34, by color coding, numerical marking or other means to indicate a particular pressure within the tire. It is thus readily seen that to provide such a device which indicates a particular pressure by having the bar, 34, in the center show through window, 28, the appropriate spring must be chosen. When the tire pressure exceeds the particular pressure the bar, 34, at the left of center will appear in window, 28, and when it is less, the bar at the right of center will appear. Calibration screw, 35, is provided for calibration of the spring-bellows combination.

It should be understood that changes and modifications in the form, construction, arrangement, and combination of the tire pressure indicator device and methods of making and using the same may be made and substituted for those herein shown and described without departing from the nature and principle of my invention.

Having thus described my invention, what I claim is new and desire to secure by United States Letters Patent is:

1. An air pressure indication device for use on conventional automobile tires, said tires provided with a valve stem containing a Schrader valve or similar valve, comprising, housing means, said housing means provided with an elongated chamber therein and said housing means provided with an inlet port and an outlet port, said inlet and outlet ports operably coupled to said chamber, and said outlet port communicating with the air in said tire, a support member operably mounted in said chamber, said inlet port threaded to mount on a conventional valve stem, air pressure measuring means operably mounted in said chamber, said air pressure measuring means comprising an aneroid bellows pressure measuring means and indicating means operably mounted thereon, wherein said aneroid bellows pressure measuring means comprises, a bellows operably mounted within said chamber, said bellows provided with a bellows chamber therein, said bellows being evacuated and air sealed, a first end of said bellows being attached to said support members, indicating means operably mounted on the second end of said bellows, a calibration spring operably mounted between said support member and said indicating means and disposed about said bellows, window means operably mounted in said chamber wall, said window means disposed such that when the air pressure in said tire varies, a particular portion of said indicating means is visible through said window, valve means (conventional Schrader valve or similar valve) operably mounted in said outlet port, said air pressure indication means provided with through ports, said through ports adapted to allow the tire to be filled while the device is installed on a tire.

2. A tire pressure indicator device comprising, housing means, said housing means provided with a chamber therein and with an inlet port and an outlet port, a support member operably mounted in said chamber, valve stem securing means operably mounted in said outlet port, valve means operably mounted in said inlet port, air pressure measuring means operably mounted within said chamber, said air pressure measuring means comprising an aneroid bellows pressure measuring means wherein said aneroid bellows pressure measuring means comprises, a bellows operably mounted within said chamber, said bellows provided with a bellows chamber therein, said bellows being evacuated and air sealed, a first end of said bellows being attached to said support member, indicating means operably mounted on the second end of said bellows, a calibration spring operably mounted between said support member and said indicating means and disposed about said bellows.

3. A tire pressure indicator device for use on vehicles provided with tubeless tires, comprising, housing means, said housing means provided with a chamber therein, a support member operably mounted in said chamber, securing means adapted to secure said housing means to said tire, pressure measuring means operably mounted in said chamber, wherein said pressure measuring means comprises, an aneroid bellow means, wherein said aneroid bellows means comprises, a bellows operably mounted within said chamber, said bellows provided with a bellows chamber therein, said bellows being evacuated and air sealed, indicator means operably mounted on the second end of said bellow means, bias spring means operably mounted between said support member and said indicator means and disposed about said bellows, end cap means operably mounted on said housing means, said end cap means provided with viewing window means.

* * * * *